United States Patent [19]

Champoux

[11] 4,425,780

[45] Jan. 17, 1984

[54] APPARATUS HAVING EXTENDED PRESTRESSING AND SLEEVE RETAINING DEVICES FOR PRESTRESSING COUNTERSUNK FASTENER HOLES AND METHOD

[75] Inventor: Louis A. Champoux, Seattle, Wash.

[73] Assignee: Fatigue Technology, Inc., Seattle, Wash.

[21] Appl. No.: 347,739

[22] Filed: Feb. 10, 1982

[51] Int. Cl.³ .................. B21D 41/02; B21D 39/06; B21K 21/16
[52] U.S. Cl. .................................... 72/370; 72/391; 72/393; 29/446
[58] Field of Search .............. 72/370, 391, 392, 393; 29/446, 523

[56] References Cited

U.S. PATENT DOCUMENTS

| | | | |
|---|---|---|---|
| 1,647,447 | 11/1927 | Hartnett | 29/512 |
| 2,459,808 | 1/1949 | Geyer | 153/80 |
| 3,056,197 | 10/1962 | Lawson | 29/552 |
| 3,157,305 | 11/1964 | Baugh | 218/42 |
| 3,270,410 | 9/1966 | Salter et al. | 29/446 |
| 3,566,662 | 3/1971 | Champoux | 72/370 |
| 3,596,491 | 8/1971 | Cress et al. | 72/283 |
| 3,665,744 | 5/1972 | Harter | 72/129 |
| 3,693,247 | 9/1972 | Brown | 29/512 |
| 3,805,578 | 4/1974 | King, Jr. | 72/370 |
| 3,835,688 | 9/1974 | King, Jr. | 72/370 |
| 3,892,121 | 7/1975 | Champoux | 72/393 |
| 3,943,748 | 3/1976 | King, Jr. | 72/393 |
| 3,949,535 | 4/1976 | King, Jr. | 52/758 |
| 4,127,345 | 11/1978 | Angelosanto et al. | 403/388 |
| 4,187,708 | 2/1980 | Champoux | 72/30 |

OTHER PUBLICATIONS

Fatigue Improvement by Sleeve Coldworking–by Joseph L. Phillips.

Primary Examiner—Lowell A. Larson
Attorney, Agent, or Firm—Eugene O. Heberer

[57] ABSTRACT

A pull gun (10) is used for pulling a mandrel (12) through an expandable sleeve (124) positioned in a fastener hole (130, 132) having a countersink (140). The mandrel expands the sleeve (124) as it moves therethrough, causing the sleeve to put the metal which surrounds the hole (132, 130) and the countersink in a state of compression. The pull gun has an axially split, expandable countersink prestressing device (16) having a generally central passageway (38) through which the mandrel (12) travels axially as it is being retracted into the pull gun. The prestressing device (16) has conical end surfaces (46) to prestress the countersink as the mandrel is pulled through the hole. The device (16) has an axially split sleeve retainer (76) extending therein so as to retain the sleeve within the fastener hole when the mandrel is being retracted. The sleeve retainer (76) is in contact with the sleeve externally of the gun and has its inner end secured in the gun. The prestressing device (16), outwardly of the gun, has a relatively small outer diameter compared with its inner end and with that of the gun, so that the outer ends (46) can be inserted into hole countersinks having limited access. The prestressing device (16), as well as the sleeve retainer (76), is made of a heat-treated ultra high strength alloy steel. Axially directed splits (48A) formed as slots in the device (16) prior to the heat-treating are narrowed so that they form narrow slits (58) at the outer end during the heat treatment. Spring fingers (42) are formed between adjacent slits (58).

41 Claims, 14 Drawing Figures

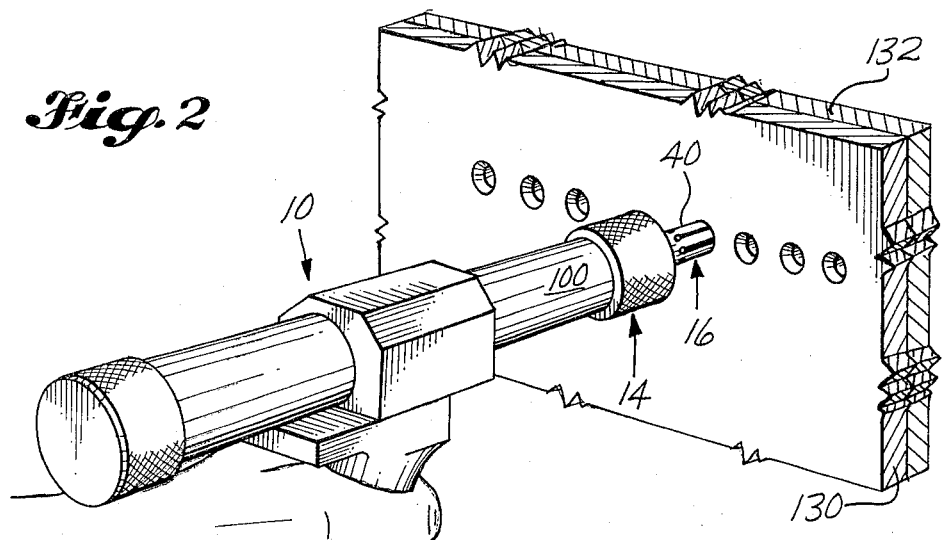
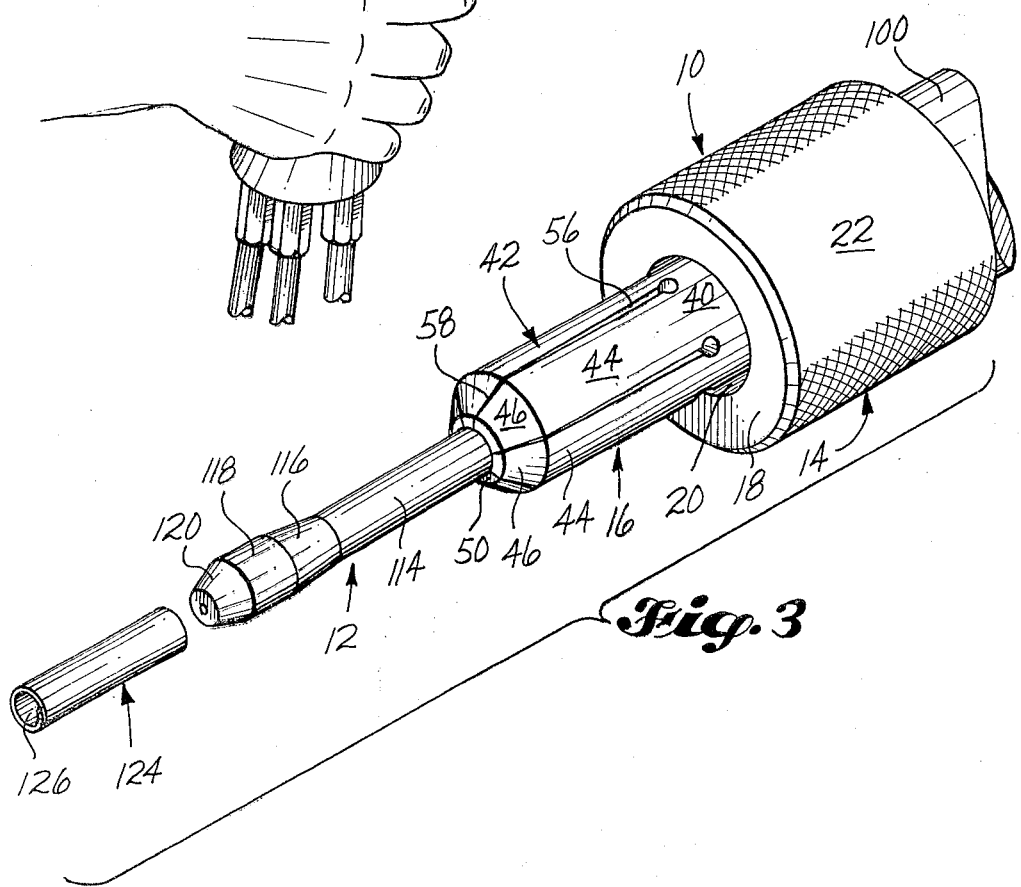

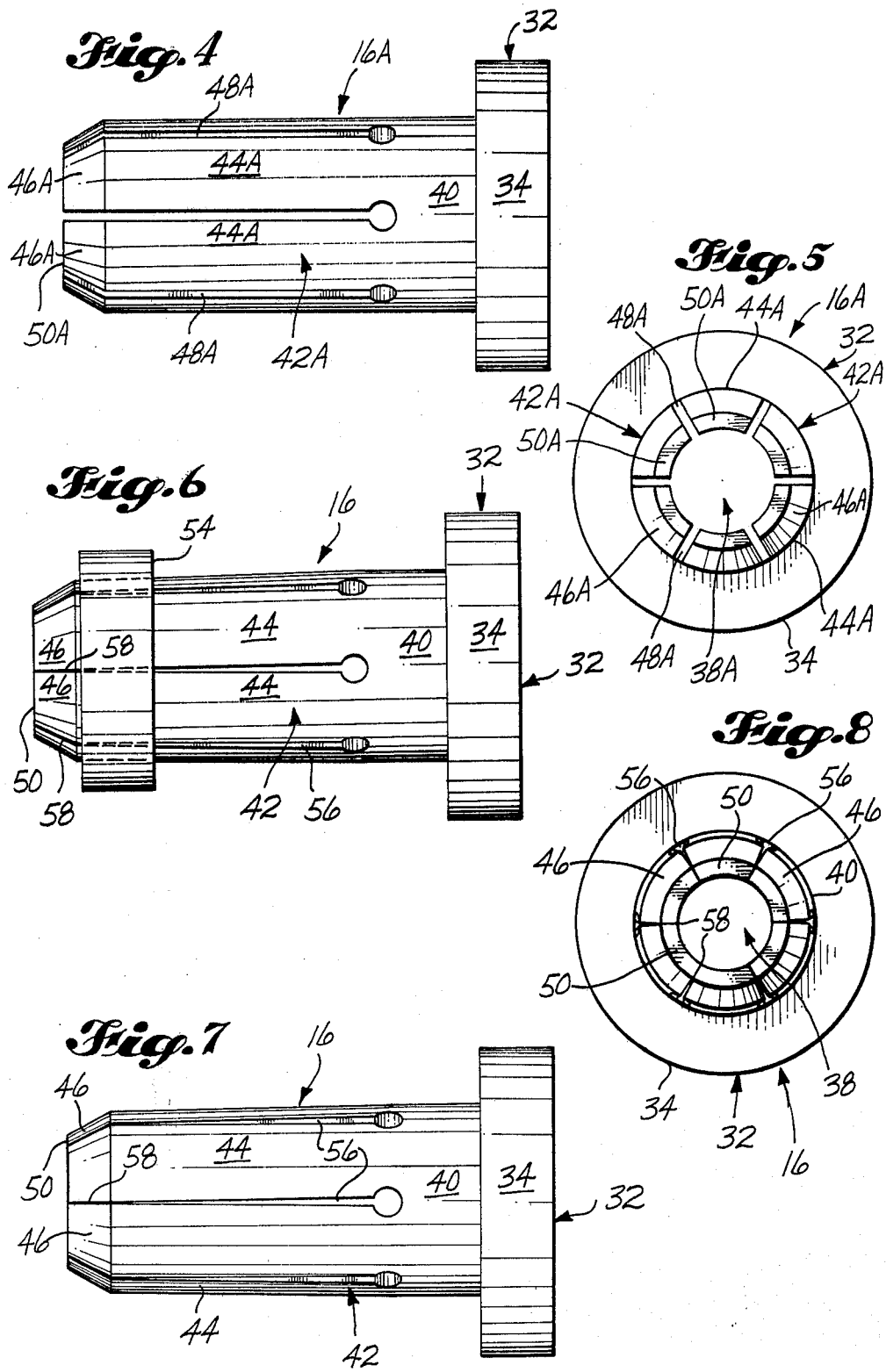

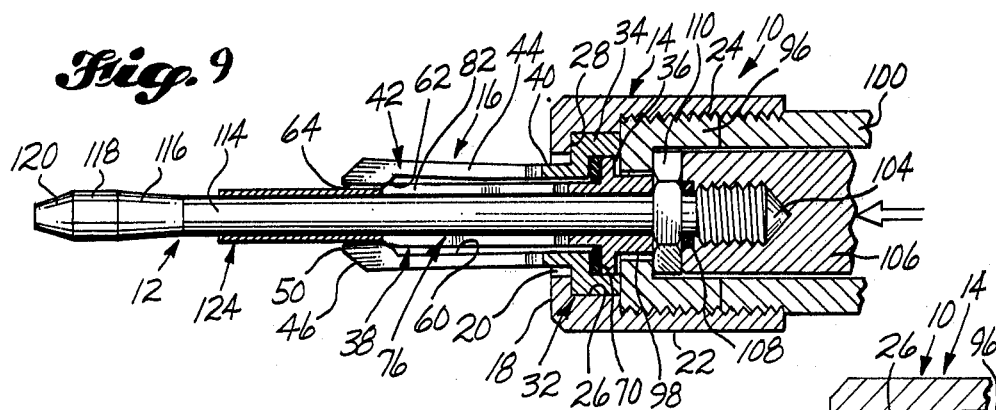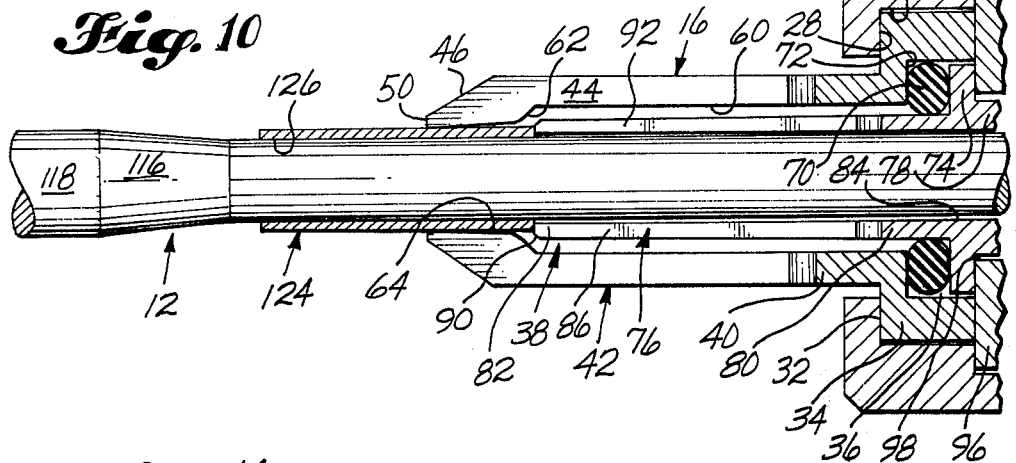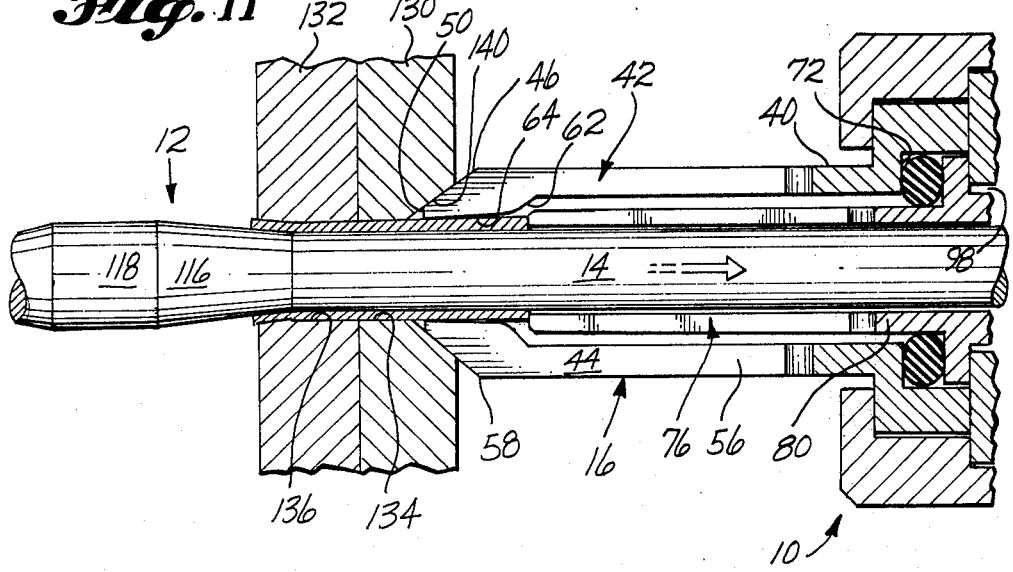

APPARATUS HAVING EXTENDED PRESTRESSING AND SLEEVE RETAINING DEVICES FOR PRESTRESSING COUNTERSUNK FASTENER HOLES AND METHOD

DESCRIPTION

Technical Field

This invention relates to a method and apparatus for prestressing countersunk fastener holes.

Cross Reference To Related Application

This application is copending with my application entitled, Apparatus And Method For Prestressing A Countersunk Fastener Hole, Ser. No. 273,725, filed June 15, 1981.

Background Art

In the prior art, pulling guns for retracting a mandrel through a hole being prestressed have large diameters relative to the size of the fastener holes and are made for operating in contact with a workpiece having the hole being prestressed. In many situations, multiple holes, that are going to be prestressed, are drilled through drill bushings in a drill fixture temporarily secured in front of the workpiece. Because reaming is performed after prestressing, it is very desirable to leave the fixture in place for the reaming, but this is not possible when the large diameter prior art prestressing tools are used.

In addition, these are protuberances adjacent to some fastener holes so as to prevent access of the relatively large pull gun to the workpiece at such holes.

Prior to my invention disclosed in copending application, Ser. No. 273,725, filed June 15, 1981, holes which were to have countersinks were prestressed as a straight hole and then the hole was countersunk. This method of countersinking required one additional step that is eliminated by the present invention and that disclosed in the aforesaid copending application.

In addition, the prior art method of countersinking after prestressing, limits the prestressing radially and the resulting improvement of fatigue properties of the countersink to the region of the prestressing of the straight hole; that is, prestressing before countersinking extends radially only as far as the prestressing of the straight hole. Another problem is that in the reworking of a hole which has been countersunk, according to the prior art method, requires that the hole be drilled to an oversized condition with subsequent prestressing, reaming, countersink machining, and installation of an oversized fastener.

The basic patent relating to prestressing or cold-expansion of fastener holes, by use of a split lubricated spacing sleeve, is my U.S. Pat. No. 3,566,662, granted Mar. 2, 1971, and entitled Coldworking Method And Apparatus. A Method And Apparatus For Making Sleeves is disclosed in U.S. Pat. No. 3,665,744, granted May 30, 1972 to Clair M. Harter. It should be noted that there also are prestressing sleeves in use that are not split. U.S. Pat. No. 3,892,121, granted July 1, 1975, to me, Horace E. Hill and Joseph L. Phillips, and entitled Apparatus For Cold-Working Holes, discloses a form of mandrel and mandrel pulling tool and gun. My U.S. Pat. No. 4,187,708, granted Feb. 12, 1980 entitled Pulling Apparatus And Method discloses a preferred form of pull gun.

The aforementioned patents, the references cited against them, and a paper by Joseph L. Phillips, entitled "Fatigue Improvement By Sleeve Coldworking", should be carefully considered for the purpose of putting the present invention into proper perspective relative to the prior art.

Disclosure Of The Invention

The present invention provides an apparatus and method for prestressing countersunk fastener holes in a workpiece wherein the holes have been drilled through a drill bushing in a drill fixture temporarily secured in front of the workpiece. Multiple drill bushings in the fixture are used to guide the drill so as to position all of the holes in the correct locations. The present invention permits the prestressing through the individual drill bushings and permits the reaming after prestressing through the same drill bushings without removing the fixture until all of the operations of the holes have been completed. The completion of the operations with the fixture in place is particularly desirable where close tolerances are required. Without the present invention, it would be necessary to drill and ream the holes with the drill fixture in position. The fixture would then be removed for the prestressing operation, and then it would be replaced for the final reaming operation.

The present invention eliminates the requirement for removing the fixture for prestressing by the provision of a relatively small diameter, gun nose piece in the form of a coutersink prestressing device at the prestressing end of the pull gun. The prestressing device is adapted to be positioned through drill bushings, where available, and in the countersink of the fastener hole being prestressed. An elongated, lubricated prestressing sleeve retainer is an important part of the invention and it is adapted to be positioned within the countersink prestressing device axially externally of the pull gun. The countersink prestressing device and the sleeve retainer both have inner ends secured within the pull gun.

By having a small diameter countersink prestressing device extending outwardly from the pulling gun, the present invention provides the additional advantage of being adapted for prestressing countersunk holes on workpieces that have protuberances that would prevent the use of a relatively large diameter prior art pulling gun and nose piece because they could not be positioned adjacent the workpiece because of the protuberances. Thus, the relatively small diameter countersink prestressing device, which is insertable through drill bushings in the drill fixture, is also usuable for engaging the workpiece where only a small space thereon is available for inserting the countersink prestressing device into the countersunk holes.

The countersink prestressing device may be comprised of two external parts connected to the gun or of a single elongated nose piece, made of a single piece of metal and threadedly engaged at its inner end to the outer end of the gun. The outer end of the elongated nose piece has a small diameter as discussed above.

The single piece nose piece and the drill fixtures are now shown in the present application but are shown in a pending application of my assignee, entitled Method And Apparatus For Prestressing Fastener Holes, in which the inventors are Robert L. Champoux and Charles M. Copple, the application being filed the same date as this application and having Ser. No. 347,717.

During the prestressing operation, a mandrel, as used in the prior art, is retracted through the prestressing device and the sleeve retainer, the retainer being adapted to retain a spacing, internally lubricated sleeve within the fastener hole. The lubricant on the inside of the sleeve allows the mandrel to expand the countersink. That is, the force required to expand the countersink is higher than that required to expand the straight portion of the hole.

A pull gun, as disclosed in my U.S. Pat. No. 4,187,708, is adapted to support the elongated countersink prestressing device and the elongated retainer, according to the invention, so that the aforesaid gun can be operated in the same manner as described in the patent.

As in my copending application, Ser. No. 273,725, filed June 15, 1981, the present invention provides an apparatus and method by which a previously drilled countersunk hole is prestressed in the region of the hole and the region of the countersink in a single one-sided operation. As in the immediately aforesaid pending application, the present invention requires only two principal process steps. The first is the drilling of the hole and the countersink in a single operation, and the second is the prestressing or cold-expansion of the hole and the countersink in a single one-sided operation.

This prestressing system has the advantage of increasing the area of compressive residual stress around the edge of the countersink to reduce susceptibility of stress corrosion.

The countersink prestressing device, as used in the apparatus and method according to the present invention, is generally tubular and has a flange on its inner end for securing in the outer end of the pull gun. The outer end of the device has a conical surface having an angle complementary to the angle of the countersink to be prestressed. The conical surface terminates axially outwardly in an annular radial edge surrounding the end of a passageway extending through the device.

The countersink prestressing device is made from unhardened ultra high strength alloy steel. A multiple number of axially directed slots are cut through the generally cylindrical wall of the device, inwardly from the outer end. The slots terminate adjacent the inner end, axially outwardly of a continuous circumferential portion which joins an inner end flange. An axially directed spring finger is thus formed between each pair of adjacent slots.

To prepare the device for heat-treating, an annular clamping device, such as a ring, is fitted over the outer axial tubular end, inwardly of the conical surface, so as to move the axially directed surfaces of each slot into contact adjacent the outer end, and thereby form narrow slits on the outer portion of the respective slots, particularly along the conical surface.

The device is then heat-treated in a conventional manner and quenched. After the clamping means is removed, the heat-treated device retains its clamped position with narrow slits at the outer ends, having their axial surfaces normally in partial contact in the conical surface area. The fingers are tapered axially outwardly and function as relatively stiff springs, adapted to stand great axially directed forces.

Inwardly of the outer end of the prestressing device, there is an approximately cylindrical, small diameter passage portion adapted to engage the split spacing sleeve when the conical surface is in prestressing contact with the countersink. At the inner end of the small diameter portion of the passageway, there are axially inwardly and radially outwardly extending cam following surfaces adapted to be acted upon by cam surfaces on an outer end of a sleeve retainer. Axially inwardly of the cam followers the prestressing device has a larger central passageway portion that terminates inwardly in a radially directed flange adapted to be secured within the end of a pull gun.

The sleeve retainer is generally tubular and has a multiple of axially directed slots, extending inwardly from the outer end, and terminating outwardly of the inner end adjacent the outer end of the gun. The retainer fits within the large diameter portion of the prestressing device passageway and has a circumferential continuous radial flange by which it is secured in the outer end of the gun.

Between flanges on the retainer and prestressing device, there is an annular spring which permits limited relative movement between the retainer and the prestressing device. This limited movement in the axial direction is for the purpose of engaging cam surfaces on the outer end of the sleeve retainer with the cam follower surfaces on the prestressing device whereby the outward movement of the sleeve retainer causes the fingers of the prestressing device to spread radially at their outer end so that a sleeve can be moved onto the mandrel between the fingers at their small diameter portion and onto the small diameter portion of the mandrel and into retention contact with the outer end of the sleeve retainer.

In the concentric arrangement of the small diameter portion of the mandrel, the retainer, and the prestressing device, there is made possible a relatively small diameter elongated nosepiece or extension of the pull gun which is adapted to fit into a countersink of a fastener hole in a small area in contrast to the relatively large diameter ends of the prior art guns and mandrel supporting devices.

The hardened prestresssing fingers serve to prestress the countersink as they are moved radially by the increasing and large diameter portions of the mandrel being retracted therethrough.

The retainer is also made of hardened steel and its fingers extending along the small diameter portion of the mandrel securely retain the split lubricated sleeve in the fastener hole as the mandrel prestresses. As the increasing diameter portion of the mandrel moves into the retainer end, the fingers are moved apart radially to maintain holding contact with the sleeve to prevent it from moving along the mandrel between the retainer and the mandrel.

Further advantages of the invention may be brought out in the following part of the specification wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 2 is a pictorial view of the invention with a countersink prestressing device having its conical end inserted into the countersink of a hole to be prestressed, there being an unshown mandrel extending through the fastener hole, the mandrel being in position for retraction into the prestressing device and the supporting pull gun;

FIG. 3 is an isometric partially exploded view, illustrating the position of a split, internally lubricated sleeve adapted to be slipped onto a mandrel, where it is to be positioned on the small diameter cylindrical portion thereof within the conical-ended countersink prestressing device extending outwardly of the pull gun;

FIG. 4 is a side elevational view of the countersink prestressing device, according to the invention, illustrating axially directed slots cut in the device before it is heat-treated;

FIG. 5 is an end view of the device taken from the left in FIG. 4;

FIG. 6 is a side elevational view of the device having its outer end clamped for heat-treating, in which the axially directed surfaces of the slots are drawn together so as to form narrow slits adjacent the outer end and so as to be in contact in at least part of the conical portion of the device;

FIG. 7 is a view illustrating the device in elevation after the heat-treating process has been completed;

FIG. 8 is an end elevational view taken from the left of FIG. 7;

FIG. 9 is a cross-sectional view of the outer end of a pull gun having a mandrel, and a countersink prestressing device and sleeve retainer, according to the invention, secured in the gun, the retainer having been moved outwardly by the inner end of the mandrel to open the coutersink device to receive a split prestressing sleeve;

FIG. 10 is a view similar to FIG. 9, illustrating the sleeve retainer in a withdrawn position relative to the countersink device, and in which the sleeve is in retention position on the retainer between the small diameter portion of the countersink device and the small diameter of the mandrel;

FIG. 11 is a view of the mandrel and sleeve in the workpiece in position to prestress the fastener hole, and the conical end of the prestressing device being in the countersink in position to prestress the same, and the retainer being in position to hold the sleeve during the prestressing operation;

BEST MODE OF THE INVENTION

Figure 1:
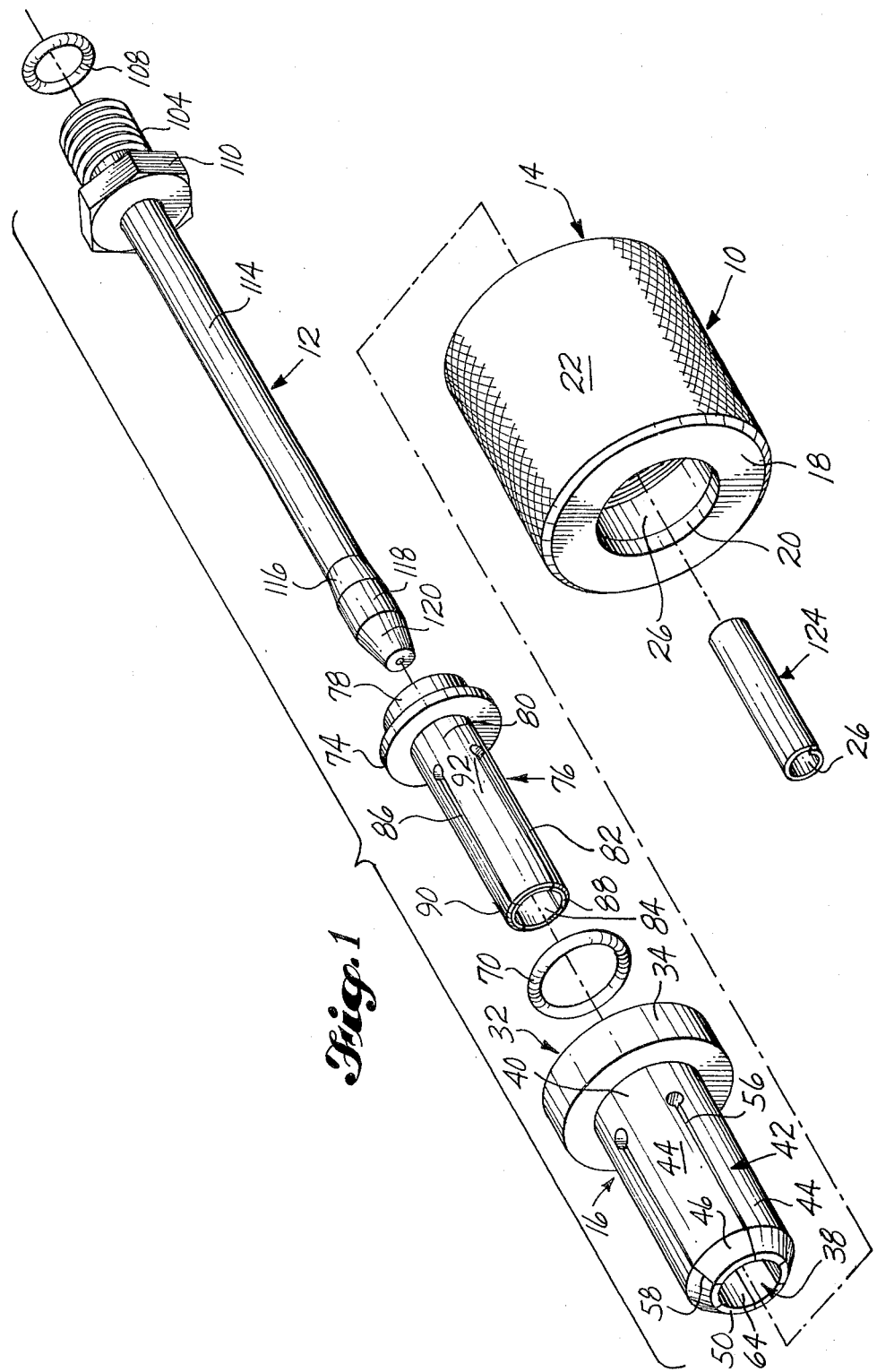
FIG. 1 is an isometric exploded view of the parts of the invention and the outer end cap of a pull gun in which the invention is carried.

Referring again to the drawings, in FIGS. 1-3, devices for prestressing a countersunk fastener hole are shown in detail. A pull gun, generally designated as 10, is shown in general outline in FIG. 2 and fragmentarily in FIGS. 1 and 3. The pull gun 10 may be of the type disclosed in my U.S. Pat. No. 4,187,708, granted Feb. 12, 1980.

Figure 14:
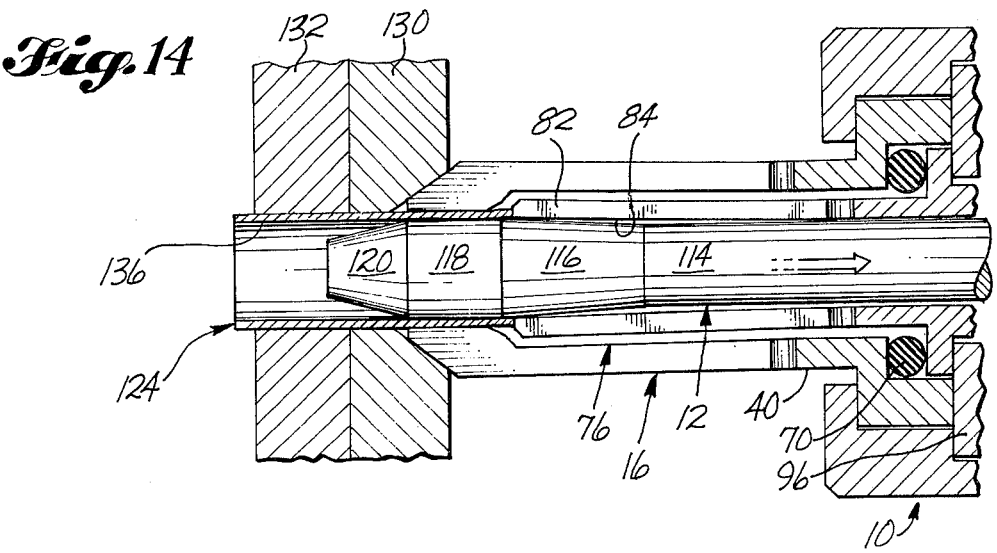
FIG. 14 is a view illustrating the final stage of the prestressing of the hole and of the countersink, the maximum diameter portion of the mandrel passing through the coutersink and expanding the retainer radially to a maximum extent while the sleeve is maintained in its retention position.

The pull gun is operated hydraulically to move a mandrel 12 from an extended, FIGS. 3, 9, and 10, to a retracted position, FIG. 14. A generally cylindrical nose cap 14, FIGS. 1-3 and 9, is provided adjacent the working and outer end of the pull gun and is adapted to secure a small diameter, elongated generally tubular countersink prestressing member or device 16 within the outer end of the gun. The cap 14 has an outer radial end wall 18 formed to include a cylindrical center opening 20. Axially inwardly of the wall 18 is an external cylindrical wall 22 having internal threads 24, FIG. 9, terminating axially forwardly in a small diameter portion 26 forming an inwardly extension of the opening 20. Inwardly of and radially outwardly of the opening 20 is a flange 28 formed by the wall 18 and which is adapted to retain a radially extending cylindrical flange base 32 of the countersink prestressing device 16, FIGS. 1, 9 and 10. The flange has an axially directed cylindrical wall 34 which at its inner end has a counterbore 36. Extending outwardly of the counterbore and through the device 16 is a generally central tubular passage 38.

To aid in understanding the inventive structure 16, as used in its completed form, as shown in FIGS. 1-3, 9 and 10, reference is made to FIGS. 4-8. The countersink prestressing device is first formed as indicated by the structure shown as 16A in FIGS. 4 and 5. The device 16A has the same flange configuration as the device 16 and extending outwardly from the flange 32 is a continuous cylindrical wall 40. Extending outwardly from the wall 40 internally is a passageway 38A which is formed of axially directed fingers generally designated as 42A, formed of generally cylindrical external surfaces 44A and external outer conical surfaces 46A. The fingers 42A are spaced by a multiple number of axially directed holes 48A, having generally parallel sides. The outer ends of the fingers 42A are formed on radial annular surfaces 50A.

The structure 16A as shown in FIGS. 4 and 5 is made from an ultra high strength alloy steel, or equivalent, prior to heat-treating. The heat-treating process and the resulting structure in the form of the device 16 is discussed with respect to FIGS. 6-8 in which the internal surfaces of the device are not shown, except for the passageway 38 at the outer end which is slightly smaller in diameter than the passage 38A at the outer end, FIG. 5. The remainder of the interior is substantially the same after heat-treating as shown in FIGS. 9 and 10, with respect to which it will be described.

As part of the heat-treating process the fingers 42A are clamped together, FIG. 6, with a ring 54 which narrows the slots 48A into axially directed splits 56 and 58. The surfaces of the splits 56 extend generally along the finger portions 44, and the surfaces 58 of the slits are substantially in contact inwardly of the radial surfaces 50, the contact extending substantially inwardly along the conical surfaces 46. The external surfaces of the fingers 42 also change from those of the fingers 42A in that the portions 44 are tapered outwardly from their inner ends to the conical surfaces 46. Thus, the outer surfaces of the finger portions 44 in cross section have decreasing diameters in the outwardly direction so that the device is generally conical outwardly of the uninterrupted cylindrical wall portion 40.

The device, as shown in FIG. 6, is heat-treated and quenched in a conventional manner and then the ring 54 is removed. After the removal of the ring, the device 16 retans the shape shown in FIGS. 6-8. The heat-treating process substantially hardens the steel and stiffens the spring fingers 42 so that the conical prestressing surfaces 46 are able to exert great force on the countersink during the prestressing operation. The conical angle of the surfaces 46 is complementary to the angle of the countersink of the hole to be prestressed.

The internal configuration of the finished device 16 is best seen in FIGS. 9 and 10. The passageway therethrough is bordered by the internal surfaces of the fingers 42, outwardly of the uninterrupted cylindrical wall 40. Internal surfaces 60 of the finger portions 44 tend to form smaller diameters axially outwardly. Axially outwardly of the surfaces 60 are conical shoulders 62 with the diameters decreasing axially outwardly. The shoulders 62 provide cam follower surfaces.

Outwardly of the surfaces 62 are finger surfaces 64 which are only slightly conical having their diameters decreasing outwardly.

At the inner end of the countersink prestressing device, FIGS. 9 and 10, the counterbore 36 is adapted to receive an annular spring in the form of an elastomeric O-ring 70. The outer end of the O-ring abuts a shoulder 72 of the bore. An annular flange 74 of a sleeve retainer generally designated as 76, FIG. 1, supports the O-ring inwardly within the gun. The sleeve retainer is somewhat similar in configuration to the countersink device and is made of the same type of material, generally a heat-treated ultra high strength alloy steel. Inwardly of the flange 74 is a large diameter continuous circumferential cylindrical portion 78 and outwardly of the flange is a somewhat smaller diameter generally cylindrical continuous circumferential tubular portion 80, terminating in an outer slotted end tubular portion 82. The sleeve retainer has a generally cylindrical passageway 84 therethrough, adapted to extend over the mandrel 12 and to be slidably engaged within the passageway of the countersink device 16.

The sleeve retainer has four annularly spaced, axially directed slots 86 extending inwardly from its outer end surfaces 88 on which there are annular cam surfaces 90 extending so as to be generally parallel, in side view, FIG. 10, to the cam follower surfaces 62 on the countersink device. Spaced between the slots 86 are four stiff axially directed spring fingers 92.

Figure 13:
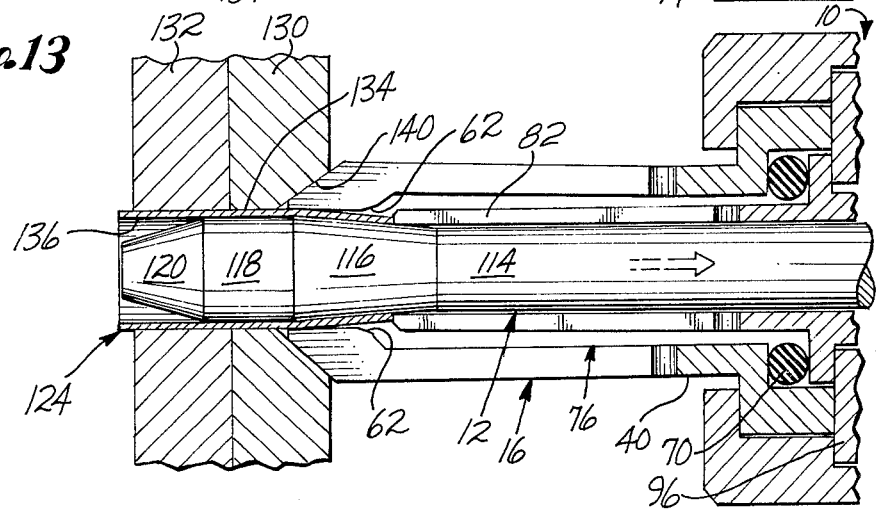
FIG. 13 is a view in which the prestressing has proceeded further, with the large diameter portion about to move against the sleeve just inwardly of the countersink prestressing portion, and illustrating the sleeve following the shape of the increasing diameter portion as it is held against the outer end of the retainer which is in a state of expansion as a result of the increasing diameter portion of the mandrel entering the same.

As shown in FIG. 1, the retainer 76 is tapered toward the end 88 and the slots 86 are decreased in width so as to be slits at the outer end 88 and in spring biased contact with the mandrel 12, FIGS. 9 and 13.

As shown in FIGS. 9 and 10, the flange 32 of the countersink prestressing device 16 has an outer radial surface in contact with an inner radial surface 28 of the nose cap 14 and the inner end of the wall 34 is in abutment with an internal nut 96 threadedly engaged with internal threads 24 of the cap 14. The nut 96 has a radially inwardly directed flange which abuts the inner end of the device 16 to secure it tightly in place within the cap 14.

The inner end 78 of the sleeve retainer is spaced by an annulus 98 from the inner axial surface of the locking nut 96. Inwardly of the nut 96 is a sleeve portion 100 of the gun threadedly engaged in the cap 14.

An inner end 104 of the mandrel is threadedly engaged in an adaptor 106, secured to a pneumatic piston of the gun, not shown. The end 104 is hand tightened into the adaptor and is locked in place by an O-ring 108. The O-ring 108 is in abutment with the plate 110 fixed to an inner end of a small diameter portion 114 of the mandrel. The outer surface of the abutment plate 110 is in pressure engagement with the end 78 of the sleeve retainer 76 when the mandrel is in its fully extended position so as to compress the O-ring 70 between the flange 74 on the sleeve retainer and the radial surface 72 of the prestressing countersink device 16.

The small diameter portion 114 of the mandrel is substantially elongated to extend outwardly through the sleeve retainer 76 and the countersink device 16. Outwardly of the small diameter portion 114 is an increasing diameter portion 116 of the mandrel, which terminates in a maximum diameter portion 118. Extending from the maximum diameter portion 118 is a tapered outer end 120.

A thin axially split, generally cylindrical cold expansion or prestressing steel sleeve 124, having an internal cylindrical surface 126 is adapted to be slipped over the outer end of the mandrel on to the small diameter portion 114. The sleeve has a comparable or higher modulus and yield than the material of the workpiece. Interior surface 126 of the sleeve has a solid film lubricant. The lubricant film is capable of withstanding more than 400,000 psi. See the aforementioned U.S. Pat. No. 3,566,662 and U.S. Pat. No. 3,665,744 for detailed descriptions of the sleeves and a manner of constructing them. The preferred lubricant comprises a molydenum disulfide, graphite, a binder, a solvent (e.g. tuluol) and possibly some lead oxide. As is known to those skilled in the art, the coefficient of friction of this lubricant can be varied by changing the various components. As stated, the lubricant allows the mandrel to expand the countersink, the force required to expand the countersink being higher than that required to expand the straight portion of the hole.

The inner small diameter slightly conical portions 64 of the fingers 42 of the countersink device are biased inwardly so as to tend to be in relatively tight contact with the mandrel portion 114 to prevent the insertion of the sleeve on the mandrel to the end of the retainer in its position of retention for the prestressing operation. As seen in FIG. 9, the mandrel is moved outwardly so that the abutting member 110 makes contact with the inner surface of the inner cylindrical portion 78 of the retainer and continues outwardly until the abutting member makes contact with the inwardly directed flange on the retaining nut 96. In this movement the inner flange 74 is moved outwardly to compress the O-ring spring 70. Simultaneously, the cam edges 90 on the outer end of the retainer make contact with the cam followers 62 axially inwardly of the small diameter portions 64 on each of the fingers 42 so as to move the outer ends of the fingers radially outwardly away from the cylindrical portion 114 of the mandrel. This permits the sleeve 124 to be moved inwardly into the retention position against the outer ends 88 of the fingers of the retainer. A slight retraction of the mandrel so that its abutting member 110 is moved away from the inner end of the retainer portion 78 permits the O-ring 70 to be expanded so as to move the flange 74 inwardly into its normal position against the locking nut 96, FIG. 10. After the cams 90 are removed from the cam followers 62, the generally conical surfaces 64 move into contact with the sleeve 124.

In FIGS. 11–14, the prestressing operation of the invention is illustrated. Two abutting workpieces 130 and 132, adapted to be secured together by a fastener, have holes 134 and 136, respectively, drilled therethrough. Because the prestressing process is a one-sided operation, the split sleeve 124 is installed on the mandrel, as shown in FIGS. 9 and 10, prior to inserting the mandrel and sleeve into the hole to be expanded and prestressed.

In FIG. 11 the mandrel had been inserted through the holes and the sleeve 124 had been moved in position in the holes by the movement of the retainer toward the workpiece as the countersink conical surfaces 50 had been moved into countersink 140 of the hole 134.

In FIG. 11, the mandrel has been started in the retraction direction, indicated by the arrow on the cylindrical portion 114, and the increasing diameter portion has started prestressing of the material around the hole 136. As this occurs, the conical surfaces 46 of the countersink prestressing device become tightly engaged in the countersink surface 140 of the hole. At the same time the retainer 76 becomes tightly engaged with the end of the sleeve to hold it in place during the prestressing operation. The internal diameter surfaces 64 at the end of the fingers 42 also tightly engage the sleeve to keep it in contact with the retainer and the mandrel surfaces as they pass therethrough.

It should be realized that when the mandrel and sleeve are inserted into the hole or holes to be prestressed, a clearance between the sleeve and the wall of the holes is necessary and is equal to approximately 0.003 inch. As may be visualized from FIG. 11, to overcome this clearance it is necessary for the beginning of the tapered section 116 of the mandrel to travel axially, after contact, approximately 0.065 inch before starting to expand the hole 136. For prestressing a hole having a countersink, it has been found that the maximum diameter portion, as 118 of the mandrel, should extend axially for about the same length as its diameter.

Figure 12:
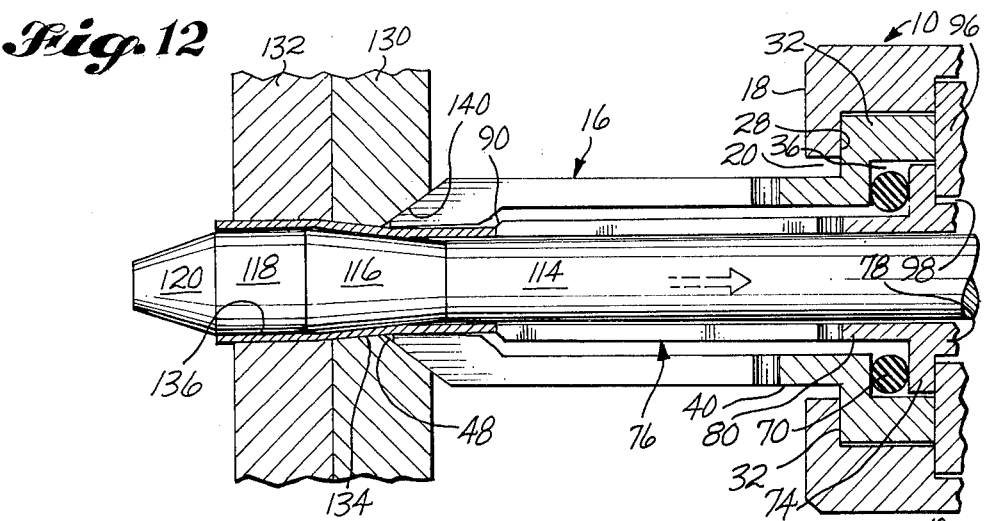
FIG. 12 is a view similar to FIG. 11 in which the mandrel has been substantially retracted into the workpiece so that the increasing diameter portion and large diameter portion of the mandrel is functioning to prestress the fastener hole.

As shown in FIG. 12, the mandrel has been retracted substantially with respect to the workpiece 132 and the increasing diameter portion 116 and the maximum diameter portion 118 prestress the area around the hole 136, as indicated by the change in configuration or cold-expansion of the sleeve portion in the hole 136. That is, the metal around the hole 136 is in compression and as the increasing diameter portion 116 moves into the hole 134, expansion of the sleeve and hole 134 has commenced.

In FIG. 13 the cylindrical part of the hole 134 has been substantially prestressed by the entry of the large diameter portion 118, and the increasing diameter portion 116 is starting to act on the countersink prestressing device within the countersink 140.

As shown in FIG. 14, the prestressing of the hole 134 and of the countersink 140 has been substantially completed. As the completion occurs the generally cylindrical surfaces 44 on the ends of the fingers remain in contact with the sleeve and aid in holding the sleeve on the end of the retainer so that the sleeve is held within the workpiece. The extent of the countersink prestressing is illustrated in FIG. 2 of my copending application Ser. No. 273,725, filed June 15, 1981.

A considerable pulling force is required to pull the mandrel through the sleeve and cold-expand or prestress the hole and countersink. The maximum diameter cylindrical portion 118 of the mandrel greatly increases the friction and pulling forces around the hole during the prestressing operation. For 3/16 inch—½ inch diameter holes in various aluminums, these forces are in the range of 2,000 to 9,000 pounds. This same pulling force on the mandrel reacts against the conical surfaces 46 of the fingers 42 and this reaction prevents the surfaces 46 from moving out of the countersink 140 during the prestressing operation. The fingers 42 are of great strength and are held axially in the countersink by the mandrel exerting pressure on the conical surfaces 46 against the countersink 140.

In the action depicted in FIGS. 13 and 14, there is no clearance between the surfaces 46 and the countersink. Therefore, part of the countersink and part of the hole are expanded simultaneously so as to result in a required higher pulling force. This increases the prestressing through a coining effect, the sleeve lubricant allowing the mandrel to expand the countersink.

Another feature that helps maintain the conical surfaces 46 in the countersink is that the outside of the sleeve is not lubricated. It first locks itself in the wall of the hole when the mandrel starts to expand the hole, and the friction between the outside of the sleeve and the surfaces 64 also provides a force to contain the split finger ends having the conical surface in the countersink.

From the foregoing, it is clear that the relatively small diameter of the countersink prestressing device 16 and the arrangement of small diameter retainer 76 substantially concentrically engaged therein, outwardly of the gun, provides great advantages in the prestressing of countersunk fastener holes. The small outside diameter of the prestressing device 16 is particularly adapted for use in prestressing through a drill bushing in a drill fixture. Such drill fixtures are typically positioned and temporarily fixed in front of the workpiece in which holes are to be drilled and then prestressed by cold expansion. In the drilling operation, the fixtures are used to guide drills through the drill bushings so as to position all of the holes in the correct location.

Because reaming is performed after the cold expansion of the holes, use of the small diameter prestressing device allows the manufacturer to leave the drill fixture in position after drilling, for the cold expansion portion of the operation, and thus enables the final reaming operation to be made through the drill bushing holes which remain in register with the original holes as drilled. It should be appreciated that the diameter of the prestressing device is only slightly greater than the diameter of the countersink being prestressed.

It should be noted that the outer end of the gun, FIG. 14, is positioned a substantial distance from the workpiece so that the gun would not interfere with protuberances on the workpiece and the small diameter of the device 16 would prevent contact with the protuberances extending from the workpiece. If necessary, the device 16 could be made substantially longer than as shown to avoid protuberances.

The invention and its attendant advantages will be understood from the foregoing description and it will be apparent that various changes may be made in the form, construction, and the arrangements of the parts of the invention without departing from the spirit and scope thereof or sacrificing its material advantages, the arrangements hereinbefore described being merely by way of example. I do not wish to be restricted to the specific form shown or uses mentioned except as defined in the accompanying claims.

What is claimed is:

1. In a pull gun of a type which is use for pulling a mandrel axially through a prestressing sleeve located within a fastener hole in a workpiece, said mandrel having an inner small diameter portion and outwardly thereof having an increasing diameter portion and outwardly thereof having an increasing diameter portion and an adjacent maximum diameter portion, so that the increasing diameter portion and the adjacent maximum diameter portion of the mandrel can exert expansion forces on the sleeve, to cause the sleeve to be expanded in the radial direction and prestress the metal around the fastener hole, and in that manner improve fatigue properties of the metal, the improvement comprising:

an axially split expandable countersink prestressing member having a generally central passageway through which the mandrel travels axially as it is being retracted into the pull gun;

an outer end of said member being adapted to engage a countersink of said fastener hole to prestress the countersink as the mandrel is being retracted through the sleeve;

said prestressing member having an inner end secured in said gun; and a sleeve retainer having an outer end outwardly of said gun and in said passageway of said prestressing member for retaining said sleeve in said fastener hole when said mandrel is retracted axially through the fastener hole, countersink, and sleeve;

said sleeve retainer having an inner end secured in said gun.

2. The invention according to claim 1 in which:

said passageway has a portion normally smaller in cross section than the maximum diameter of the mandrel and a substantial part of the increasing diameter portion of the mandrel, so that as the mandrel moves through such passageway portion it expands the passageway by forcing portions of the prestressing member spaced between the splits apart and causes the outer end of said member to engage the countersink to prestress it as the increasing diameter and maximum diameter portions of the mandrel are retracted through the sleeve and countersink.

3. The invention according to claim 1 in which:

said prestressing member outwardly of said gun has a relatively small outer diameter compared with its inner end and with that of said gun;

said outer end extending outwardly of said gun at a distance substantially greater than the length of movement of the maximum diameter of the mandrel through the fastener hole.

4. The invention according to claim 1 in which:

said outer end of the prestressing member is of conical shape, having substantially the same angle as the countersink.

5. The invention according to claim 1 in which:

said maximum diameter portion of the mandrel has an axial length about equal to its diameter.

6. The invention according to claim 1 in which:

said sleeve retainer is an elongated tubular member normally surrounding said small diameter portion of said mandrel;

the sleeve retainer extending within said passageway in the prestressing member outwardly of said gun between the mandrel and the prestressing member;

the sleeve retainer having an outer end to engage an inner end of the sleeve to retain it in the fastener hole while the hole and countersink are being prestressed as the mandrel is retracted.

7. The invention according to claim 6 in which:

said sleeve retainer has a plurality of annularly spaced, axially directed slots extending inwardly from the outer end and terminating inwardly adjacent the outer end of the gun;

axially directed spring fingers extending between adjacent slots;

said retainer being slidable axially within said passageway relative to said prestressing member;

means on an inner portion of said mandrel for engaging the inner end of said retainer and moving it outwardly relative to said passageway; and means on internal surfaces of said prestressing member within said passageway for being engaged by the outer end of the retainer, when the retainer is moved outwardly, to expand the outer end of the prestressing member radially so that a sleeve on the mandrel can be positioned in retaining contact with the outer end of the retainer.

8. The invention according to claim 7 including:

spring means between portions of said retainer and said prestressing member for moving said retainer inwardly out of said engagement with the prestressing means when the mandrel is retracted and the means on the inner portion thereof are disengaged from the inner end of the retainer.

9. The invention according to claim 7 in which:

said splits in said prestressing member extending inwardly from the outer end and adapted to terminate outwardly of the gun;

said last splits being annularly spaced by axially directed resilient elongated portions;

said means on said internal surfaces of said prestressing member being annularly arranged cam followers on each of said resilient elongated portions;

each of said resilient elongated portions forming internal surfaces of said passageway;

said passageway having a large diameter portion axially inwardly of said cam followers, said retainer extending in said last portion;

a small diameter portion of said passageway extending outwardly of said cam followers; and outer portions of the resilient elongated portions forming said small diameter portion and being adapted to tightly engage the sleeve during the prestressing operation.

10. The invention according to claim 9 in which:

said prestressing member is generally tubular outwardly of said gun;

the outer external end of the prestressing member, formed of the elongated resilient portions, has a conical shape having an angle complementary to the angle of the countersink.

11. The invention according to claim 10 in which:

the respective axial surfaces of said splits between said elongated resilient portions are in substantial contact adjacent said outer external end so as to form narrow slits.

12. The invention according to claim 9 in which:

said fingers of said retainer have cam surfaces on their outer ends for engaging said cam followers on said prestressing member to expand the outer end of the prestressing member.

13. The invention according to claim 8 in which:

said spring means is an O-ring.

14. The invention according to claim 11 in which:

said prestressing member outwardly of said gun has a relatively small outer diameter compared with its inner end and that of said gun;

said outer end extending outwardly of said gun a distance substantially greater than the length of movement of the maximum diameter of the mandrel through the fastener hole.

15. A method of prestressing a countersunk fastener hole in a metal member, comprising:
positioning a prelubricated cold-expansion sleeve on a reduced diameter intermediate portion of a cold-expansion mandrel, said intermediate portion being axially inwardly of an increasing diameter portion, and a maximum diameter portion of said mandrel extending outwardly of said increasing diameter portion;
inserting the mandrel and sleeve into the hole from its countersunk side;
holding the sleeve in the hole with a tubular sleeve retainer normally extending around the reduced diameter of the mandrel outwardly of a pull gun and spaced axially from the hole;
inserting an elongated axially plurally split generally tubular countersink prestressing member into the countersink, the prestressing member having a passageway and being radially outwardly of the sleeve and the retainer; and
retracting the mandrel through the sleeve, through the retainer, and through the countersink prestressing member,
so that as the mandrel is retracted the increasing and maximum diameter portions of the mandrel expand the sleeve radially to prestress the metal surrounding the hole, and expand the prestressing member radially to prestress the metal surrounding the countersink.

16. The method according to claim 15 including the positioning of the sleeve on the mandrel:
moving the mandrel and retainer outwardly of the gun relative to the prestressing member;
radially expanding the outer end of the prestressing member away from the mandrel by moving the retainer against surfaces thereof;
inserting a sleeve between the outer end of the prestressing member and the mandrel;
retracting the mandrel relative to the retainer;
biasing the retainer axially inwardly to its sleeve retention position; and
sliding the sleeve on the mandrel into retention contact with the outer end of the retainer.

17. The method according to claim 15 in which:
said prestressing member has a relatively small outer diameter compared with the gun and has a relatively minimum diameter with respect to the mandrel, but has sufficient strength to prestress the countersink while the mandrel is pulled therethrough with great force.

18. The method according to claim 15 in which:
the sleeve retainer and the countersink prestressing member extend outwardly of the gun a distance substantially greater than the length of movement of the maximum diameter portion through the fastener hole.

19. The method according to claim 15 in which:
said retainer has a multiple of axially directed annularly spaced slots extending inwardly from the outer end and terminating inwardly adjacent the outer end of the gun; and
axially directed spring fingers extending between adjacent slots.

20. The method according to claim 15 including:
means on an inner portion of said mandrel for engaging the inner end of said retainer and moving it outwardly relative to said passageway; and
means on internal surfaces of said prestressing member within said passageway for being engaged by the outer end of the retainer, when the retainer is moved outwardly, to expand the outer end of the prestressing member radially so that a sleeve on the mandrel can be positioned in retaining contact with the outer end of the retainer.

21. The method according to claim 20 including:
spring means between portions of said retainer and said prestressing member for moving said retainer inwardly out of said engagement with the prestressing means when the mandrel is retracted and the means on the inner portion thereof are disengaged from the inner end of the retainer.

22. The method according to claim 15 in which:
said prestressing member having an outer end inserted in the countersink, the splits in the prestressing member extending inwardly from the outer end and terminating outwardly of the pull gun;
said last splits being annularly spaced by axially directed resilient elongated portions; the outer end of the prestressing member, being formed of the elongated resilient portions, and having a conical shape having an angle complementary to the angle of the countersink.

23. The method according to claim 22 in which:
the respective axial surfaces of as said splits between said elongated resilient portions are in substantial contact adjacent said outer external end so as to form narrow slits.

24. Apparatus for prestressing a countersunk fastener hole in a workpiece, comprising:
a mandrel for inserting into the hole for retracting therefrom, said mandrel having a reduced diameter portion, an increasing diameter portion axially outwardly of said reduced diameter portion, and a maximum diameter portion axially outwardly of said increasing diameter portion;
an expandable disposable cold-expansion sleeve for carrying on the reduced diameter portion and insertable into the hole to serve as a spacer during the prestressing operation, and for receiving exerted sliding expansion forces from said increasing diameter and maximum diameter portions as the mandrel is retracted through the hole while simultaneously carrying said forces in a radial direction to the inside surface of the hole for hole enlargement and for putting the metal around the hole in compression to improve fatigue properties of the metal;
an axially split expandable countersink prestressing member having a generally central passageway through which the mandrel travels axially as it is being retracted;
an outer end of said member being adapted to engage a countersink of the fastener hole to prestress the countersink as the mandrel is being retracted through the sleeve;
said prestressing member having an inner end securable in a pull gun adapted to retract the mandrel; and
a sleeve retainer having an outer end to extend outwardly of said gun and in said passageway of said prestressing member to retain the sleeve in the fastener hole externally of the gun when said mandrel is retracted axially through the fastener hole, countersink, and sleeve;
said sleeve retainer having an inner end securable in said gun.

25. The apparatus according to claim 24 in which:
said prestressing member has a relatively small outer diameter adjacent its outer end compared with its inner end and with that of a suitable pull gun;
said outer end of said prestressing member for extending outwardly of a pull gun a distance substantially greater than the length of movement of the maximum diameter of the mandrel through the fastener hole.

26. The apparatus according to claim 24 in which:
the outer end of the prestressing member is of conical shape, having substantially the same angle as the countersink.

27. The apparatus according to claim 24 in which:
said maximum diameter portion of the mandrel has an axial length about equal to its diameter.

28. The apparatus according to claim 24 in which:
said sleeve retainer is an elongated tubular member normally surrounding the small diameter portion of the mandrel;
the sleeve retainer extending within said passageway in the prestressing member between the mandrel and the prestressing member;
the sleeve retainer having an outer end to engage an inner end of the sleeve to retain it in the fastener hole while the hole and countersink are being prestressed as the mandrel is retracted.

29. The apparatus according to claim 28 in which:
said sleeve retainer has a plurality of annularly spaced, axially directed slots extending inwardly from the outer end and terminating inwardly adjacent the outer end of the gun;
axially directed spring fingers extending between adjacent slots;
said retainer being slidable axially within said passageway relative to said prestressing member;
means on an inner portion of said mandrel for engaging the inner end of said retainer and moving it outwardly relative to said passsageway; and
means on internal surfaces of said prestressing member within said passageway for being engaged by the outer end of the retainer, when the retainer is moved outwardly, to expand the outer end of the prestressing member radially so that a sleeve on the mandrel can be positioned in retaining contact with the outer end of the retainer.

30. The apparatus according to claim 29 in which:
spring means between portions of said retainer and said prestressing member for moving said retainer inwardly out of said engagement with the prestressing means when the mandrel is retracted and the means on the inner portion thereof are disengaged from the inner end of the retainer.

31. The apparatus according to claim 29 in which:
said splits in said prestressing member extending inwardly from the outer end and terminating outwardly of said gun;
said last splits being annularly spaced by axially directed resilient elongated portions;
said means on said internal surfaces of said prestressing member being annularly arranged cam followers on each of said resilient elongated portions;
each of said resilient elongated portions forming internal surfaces of said passageway;
said passageway having a large diameter portion axially inwardly of said cam followers, said retainer extending in said last portion;
a small diameter portion of said passageway extending outwardly of said cam followers; and
outer portions of the resilient elongated portions forming said small diameter portion and being adapted to tightly engage the sleeve during the prestressing operation.

32. The apparatus according to claim 29 in which:
said prestressing member is generally tubular;
the outer external end of the prestressing member, formed of the elongated resilient portions, has a conical shape having an angle complementary to the angle of the countersink.

33. The apparatus according to claim 31 in which:
the respective axial surfaces of said splits between said elongated resilient portions are in substantial contact adjacent said outer external end so as to form narrow slits.

34. The apparatus according to claim 31 in which:
said fingers of said retainers have cam surfaces on their outer ends for engaging said cam followers on said prestressing member to expand the outer end of the prestressing member.

35. The apparatus according to claim 30 in which:
said spring means is an O-ring.

36. The apparatus according to claim 33 in which:
said prestressing member has a relatively small outer diameter on an outer end thereof compared with the diameter on the inner end and the diameter of a pull gun;
said outer end adapted to extend outwardly of a pull gun a distance substantially greater than the length of movement of the maximum diameter of the mandrel through the fastener hole.

37. For use as a countersink prestressing device adapted to extend a substantial distance outwardly from a pull gun wherein said pull gun is adapted for pulling a mandrel axially through a prestressing sleeve in a workpiece fastener hole having a countersink so that varied diameter portions of the mandrel exert expansion forces on the sleeve and on the countersink prestressing device, to cause the sleeve and the device to be expanded radially and prestress the metal around the fastener hole and the countersink, and in that manner improve fatigue properties of the metal;
the countersink prestressing device comprising:
an elongated generally tubular member having an inner and an outer end, and a generally central passageway therethrough;
the outer end being conical having an angle complementary to the countersink;
means on the inner end for securing the member in the pull gun;
a multiple of annularly spaced, axially directed alternate slots and spring fingers extending axially inwardly from the outer end to positions axially outwardly of the inner end; and
adjacent fingers normally being in axial contact at the outer conical end at axially directed surfaces of the slots.

38. The countersink prestressing device according to claim 37 including:
a small diameter passageway portion adjacent the outer end so that it fits on a prestressing sleeve radially inwardly of the countersink during prestressing.

39. The countersink prestressing device according to claim 38 including:

cam follower surfaces radially outwardly and axially inwardly of said small diameter passageway portion to be acted upon by cam surfaces of a sleeve retainer.

40. The countersink prestressing device according to claim 37 in which:

said tubular member axially inwardly of said slots has an annular outer continuous circumferential generally cylindrical surface;

a large diameter flange on said inner end providing said means for securing the member in the pull gun.

41. The countersink prestressing device according to claim 37 in which:

the outer axially directed surfaces of said fingers taper from their inner ends toward their outer ends.

* * * * *

UNITED STATES PATENT AND TRADEMARK OFFICE
CERTIFICATE OF CORRECTION

PATENT NO. : 4,425,780
DATED : January 17, 1984
INVENTOR(S) : Louis A. Champoux

It is certified that error appears in the above-identified patent and that said Letters Patent are hereby corrected as shown below:

Column 1, line 30, "these" should be --there--.

Column 2, line 60, "now" should be --not--.

Column 6, line 35, "holes" should be --slots--.

Column 6, line 67, "retans" should be --retains--.

Column 10, lines 66 and 67, "an increasing diameter portion and outwardly thereof having" should be deleted.

Signed and Sealed this

*Twenty-fourth* Day of *July 1984*

[SEAL]

*Attest:*

GERALD J. MOSSINGHOFF

*Attesting Officer*        *Commissioner of Patents and Trademarks*